(No Model.)

W. McCRACKEN.
TONGS FOR DRAWING SKELPS.

No. 508,738.          Patented Nov. 14, 1893.

Witnesses:
Ray Hutchins.
Herbert Cowell

Inventor:
William McCracken By
Thos. H. Hutchins
Attorney.

THE NATIONAL LITHOGRAPHING COMPANY,
WASHINGTON, D. C.

UNITED STATES PATENT OFFICE.

WILLIAM McCRACKEN, OF KEWANEE, ILLINOIS.

TONGS FOR DRAWING SKELPS.

SPECIFICATION forming part of Letters Patent No. 508,738, dated November 14, 1893.

Application filed March 18, 1893. Serial No. 466,588. (No model.)

*To all whom it may concern:*

Be it known that I, WILLIAM MCCRACKEN, a citizen of the United States of America, residing at Kewanee, in the county of Henry and State of Illinois, have invented certain new and useful Improvements in Tongs for Drawing Skelps, of which the following is a specification, reference being had therein to the accompanying drawings and the letters of reference marked thereon, forming a part of this specification, in which—

Figure 1:
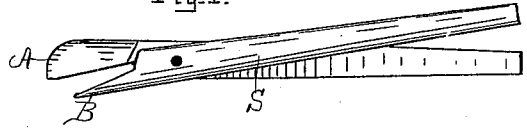
Figure 2:
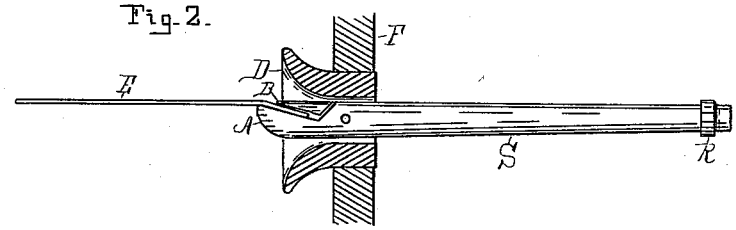
Figure 3:
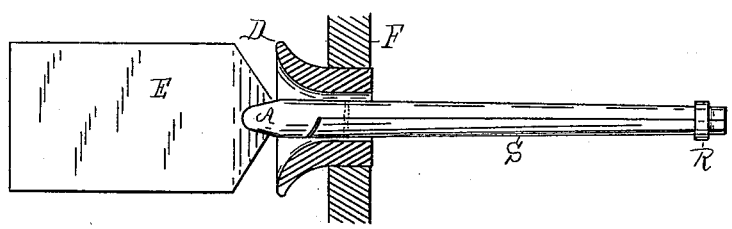
Figure 4:
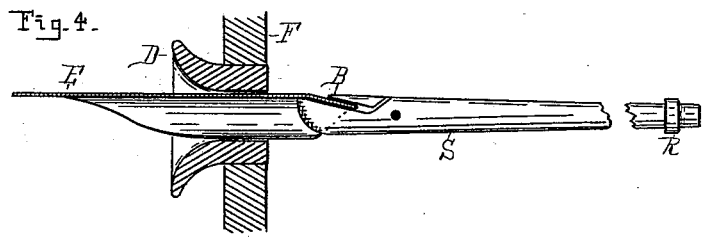

Figure 1 is a side view of the tongs for grasping the skelp to draw it through the pipe forming bell. Fig. 2 is a side view of the tongs shown as grasping a skelp direct, and a central section of the bell showing it in position after having been slipped on over the tongs. Fig. 3 is a plan view of the tongs shown as grasping a skelp, and a horizontal section of the bell shown as slipped on over the tongs, and Fig. 4 is a central vertical section of the bell and of the end of the skelp drawn through the bell, and a side view of the tongs grasping said skelp.

This invention relates to certain improvements in tongs for grasping skelps to draw them through a tube forming bell, which improvements are fully set forth and explained in the following specification and claim.

The object of this invention is to render it unnecessary to attach a tag to the end of a skelp to reach through the tube forming bell to be grasped by tongs to draw the skelp through, but to use tongs adapted to grasp a skelp while in the furnace, and then slip the bell on over the tongs up to the skelp, thus saving the labor, delay and expense of attaching a tag to the end of each skelp.

Referring to the drawings S represents the tongs formed so that when the two jaws A and B are closed the tongs will be small enough, and formed so that the pipe forming bell D can be slipped on over the tongs after it has closed on a skelp by means of its jaws A. B. The opening between the jaws is oblique as shown in Figs. 2 and 4 so that when a skelp is grasped it will be brought in line with the point of the jaw B, and with that side of the tongs so as to bring the center of the skelp to one side of the bell opening so that the bell may cause the two edges of the skelp to be brought together and welded. The jaw A. of the tongs is formed so as to support the skelp and guide it until it has passed through the bell, and the pipe has commenced to be formed, the form of said jaw being blunt and extending forward on a line with that side of the tongs, and rounded a little on its outer end so as to permit the outer end of the tongs to be elevated and not cause the jaws of the tongs to bind in the bell. It is intended to have the tongs take the place of a tag attached to the skelp, and that the tongs shall be used to grasp a skelp while in the furnace, and after it has grasped the skelp and the legs of the tongs are closed together, the bell is to be slipped on over the tongs up to the skelp, and the ring R slipped on over the end of the tongs to cause the jaws of the tongs to maintain their grip on the skelp, and the bell is then placed in a frame F, or in any device to hold it while the tongs pull the skelp through the bell, thus dispensing with the necessity of fixing a tag to the skelp to be grasped by tongs after the tag has first been passed through the bell. If desired however the tongs may be passed through the bell to grasp a skelp in the furnace, as the tongs are of such form as to permit their passage through the bell.

Having thus described my invention, what I claim as new, and desire to secure by Letters Patent, is as follows, to wit:

The tongs S having the jaws A and B, said jaws having faces lying in a plane oblique to the axis or length of the tongs when closed, the jaw A having a blunt rounded end to form a support and guide to the skelp, and the jaw B terminating in a point on a line with the side of the tongs, all combined and arranged to operate substantially as and for the purpose set forth.

WILLIAM McCRACKEN.

Witnesses:
GEORGE A. PETTIT,
WILLIAM GRELL.